W. MEYER.
ELECTRICAL MEASURING INSTRUMENT.
APPLICATION FILED AUG. 23, 1915.
1,257,514.
Patented Feb. 26, 1918.
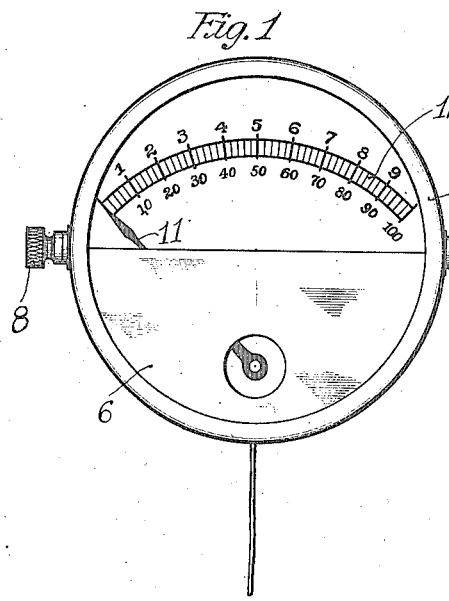
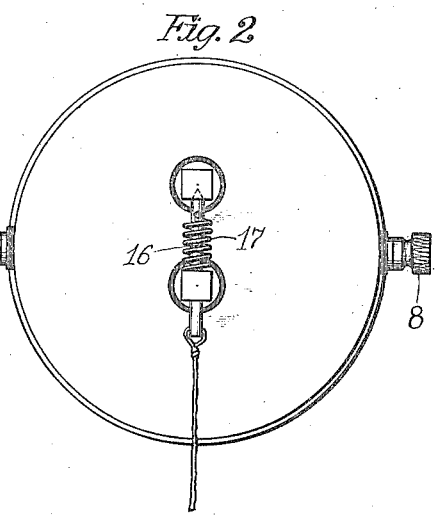
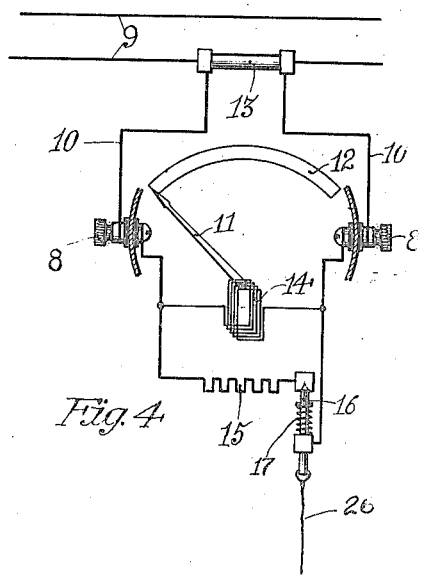
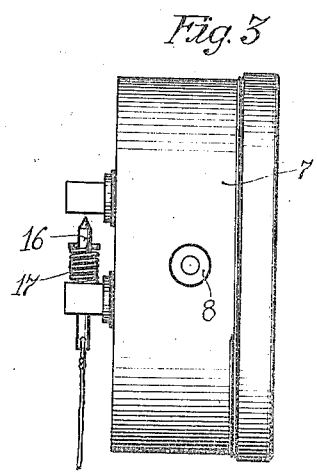
Inventor
William Meyer
By Brown, Hanson & Roettcher
Attorneys

UNITED STATES PATENT OFFICE.

WILLIAM MEYER, OF CHICAGO, ILLINOIS.

ELECTRICAL MEASURING INSTRUMENT.

1,257,514.   Specification of Letters Patent.   Patented Feb. 26, 1918.

Application filed August 23, 1915. Serial No. 46,832.

*To all whom it may concern:*

Be it known that I, WILLIAM MEYER, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to electrical measuring instruments, particularly those instruments in which a double scale is provided.

A double scale instrument, as is understood by those skilled in the art, consists generally of a galvanometer having its scale graduated and marked to read from zero to a predetermined value by assigning to the scale divisions a certain value and to read from zero to a higher value, usually a decimal multiple of the first predetermined value, under certain other conditions, when a different certain value is assigned to the scale divisions.

The first manner of reading and assigning the scale values is employed when the meter is required to be more sensitive as when it is connected directly to the circuit. The meter is then said to read upon the lower scale.

The second manner of reading and assigning scale values is employed when the meter is required to be less sensitive as when it is shunted by a suitable resistance and is then said to read upon the higher scale. The position of the scales on the face of the meter has nothing to do with the designation "Higher scale"—"Lower scale."

When measuring current with a double-scale instrument of the ordinary type, care must be taken not to permit too large a current to flow through the movable coil of the instrument. When measuring relatively large currents the usual practice is to connect a shunt in parallel with the movable coil, so that only a small portion of the current passes through the coil. For this purpose a switch has usually been employed. In practice, however, it often happens that the operator forgets to close the switch. Consequently, a large amount of current flows through the coil, which may result in seriously damaging, or even ruining, the instrument.

The object of my invention is to provide a double-scale instrument with means for always causing it to read on the high scale unless a continued conscious effort is made by the operator to cause it to read on the low scale.

A further object is to provide connections so that the shunt is always connected in parallel with the coil of the instrument, in case the instrument is an ammeter, unless it is desired to measure relatively small currents, in which case the shunt is disconnected by the operator; the arrangement being such that the operator must hold the shunt open at all times while measuring small currents.

My invention will be better understood by reference to the accompanying drawings forming a part of this specification, in which, Figure 1 is a front elevational view of an ammeter embodying my invention;

Fig. 2 is a rear elevational view showing the means employed for connecting the shunt in parallel with the coil of the ammeter;

Fig. 3 is a side elevational view of the structure shown in Fig. 2;

Fig. 4 is a diagrammatic view showing my invention applied to an ammeter.

Referring to the drawings, it will be seen that the ammeter 6 is surrounded by a casing 7, to which binding-posts 8—8 are fastened in any suitable manner. The ammeter is connected in series in the circuit 9 by means of suitable lead-wires 10—10, secured to the binding-posts 8—8. The ammeter 6 is provided with a pointer 11, and so arranged that it will be deflected over the double scale 12 when current flows through the instrument.

In order to increase the range of the instrument, a resistance shunt 13 of known value may be connected across the terminals of the instrument, thus permitting only a part of the current flowing in the mains 9—9 to pass through the instrument; that is, to increase the range of an ammeter having a resistance of R ohms from I to I' amperes, a shunt S, the resistance of which may be calculated by the formula $$S = \frac{RI}{I'-I},$$

must be connected across the terminals of the ammeter. For example, in order to measure current up to 135 amperes with an ammeter the resistance of which is .0022 ohms, and the maximum reading of which is 15 amperes, a resistance shunt the value of which we find by substituting in the above formula, to be:

$$\frac{.0022 \times 15}{135-15} = .000275 \text{ ohm},$$

must be used. When so shunted the indicated reading must be multiplied by $$\frac{135}{15} = 9$$

to give the total current flowing in the mains; or, the instrument may be calibrated, so that the current flowing in the mains may be read in amperes directly from the scale.

As shown in Fig. 4, the movable coil 14, to which the pointer of the instrument is mechanically connected, may be shunted by a shunt 15, the resistance of which is such that only one-tenth of the current flowing through the instrument will flow through the coil 14, in which case the current flowing in the mains 9—9 may be read in amperes from the higher values of the scale 12, providing the instrument is properly calibrated. The shunt about the meter element thus makes it less sensitive.

When it is desired to measure relatively small currents, the shunt 15 is opened by the operator manually pulling on the string 26 and holding down the plunger 16 against the tension of the spring 17. The use of the string 26 for opening the switch permits the shunt to be opened at a distance. Thus in X-ray work in which I employ the invention the operator may be engaged in adjusting the apparatus to give the proper current discharge through the X-ray tube and he may open the shunt by means of the string without damaging the instrument and without being compelled to walk from the rheostat or other controlling position to the meter in order to make the proper setting of the device. Opening the shunt 15 causes all of the current flowing through the instrument to flow through the coil 14, in which case the current flowing in the mains 9—9 may be read in amperes from the upper portion of the scale 12.

In Fig. 2 the plunger 16 is shown in its uppermost position, in which case the shunt 15 is closed while in Fig. 3 the plunger 16 is shown in its lowermost position, the shunt 15 being open.

It will now be clear that, with my invention, it is impossible for large current to flow through the coil of an instrument by neglect on the part of the operator, because a shunt is always connected in parallel with the coil, in the case of an ammeter, unless the operator, by continued conscious effort, pulls down and holds down the switch against the tension of the spring.

It will be obvious that my invention may be applied to any electrical device employing a movable coil, such as wattmeters, galvanometers, or the like.

I do not intend to be limited to the precise details of construction, as it is apparent to those skilled in the art that changes and modifications may be made without departing from the spirit and scope of my invention.

What I claim is:

1. In a double scale instrument having a higher scale and a lower scale, a metallic casing, a pair of terminals insulated from the casing, a movable instrument coil having its terminals permanently connected to said terminals, a switch comprising a pair of insulated contacts mounted on the back of said metallic casings, said contacts being connected to the terminals of the movable coil, a spring plunger guided in one of said contacts and normally connecting said contacts, a spring for holding said plunger in closed position, a shunt of a fixed predetermined resistance, connected in series with said switch across said coil, and a string secured to said plunger for opening the shunt switch at any desired distance from the instrument.

2. In combination, a meter element, a metallic casing for said element, a switch comprising a pair of metallic contact posts secured to and insulated from said casing, a cylindrical plunger passing through one of said posts, a coiled spring about said plunger for holding the other end of said plunger in contact with said other post, a resistance connected to said switch, and being adapted to be connected in shunt of the metering element when the switch is closed to cause the meter element to be less sensitive, and a string secured to the other end of said plunger for opening the switch at any desired distance for reading the meter in more sensitive condition.

3. In combination, a meter element, a metallic casing for said element, a switch comprising a pair of metallic contact posts secured to and insulated from said casing, one above the other, a plunger passing through said lower contact and guided therein, said plunger having a conical upper end, said other post having a coöperating conical seat for the upper end of the plunger, a spring for normally forcing the plunger into contact with the seat, a resistance connected to said switch and being adapted to be connected in shunt of the metering element when the switch is closed to cause the meter element to be less sensitive and a string secured to the lower end of said plunger for opening the switch at any desired distance for reading the meter in a more sensitive condition.

In witness whereof, I hereunto subscribe my name this 17th day of August, A. D. 1915.

WILLIAM MEYER.